(12) United States Patent
Mannherz et al.

(10) Patent No.: US 10,399,552 B2
(45) Date of Patent: Sep. 3, 2019

(54) METHOD AND DEVICE FOR OPERATING A HYDRAULIC BRAKE SYSTEM, BRAKE SYSTEM

(71) Applicant: Robert Bosch GmbH, Stuttgart (DE)

(72) Inventors: Edith Mannherz, Weinsberg (DE); Helmut Wolff, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 4 days.

(21) Appl. No.: 15/824,505

(22) Filed: Nov. 28, 2017

(65) Prior Publication Data
US 2018/0148033 A1 May 31, 2018

(30) Foreign Application Priority Data

Nov. 30, 2016 (DE) .................. 10 2016 223 826

(51) Int. Cl.
*B60T 17/22* (2006.01)
*B60T 13/14* (2006.01)
*B60T 13/74* (2006.01)
*B60T 13/58* (2006.01)

(52) U.S. Cl.
CPC ............ *B60T 17/22* (2013.01); *B60T 13/145* (2013.01); *B60T 13/588* (2013.01); *B60T 13/741* (2013.01); *B60T 13/745* (2013.01)

(58) Field of Classification Search
CPC ....... B60T 17/22; B60T 13/145; B60T 13/745
See application file for complete search history.

(56) References Cited

U.S. PATENT DOCUMENTS

| 8,087,732 | B2 * | 1/2012 | Averbeck | ................. | B60T 8/32 303/122.09 |
| 2013/0325278 | A1 * | 12/2013 | Bieltz | ..................... | B60T 7/107 701/70 |
| 2015/0260246 | A1 * | 9/2015 | Yao | ........................ | B60T 13/74 701/70 |
| 2017/0350462 | A1 * | 12/2017 | Yao | ........................ | B60T 1/065 |

* cited by examiner

*Primary Examiner* — Vishal R Sahni
(74) *Attorney, Agent, or Firm* — Maginot, Moore & Beck LLP

(57) ABSTRACT

A method for operating a hydraulic brake system of a motor vehicle includes checking a functional capability of the brake system by detecting a plurality of idle travel values of an actuator before the actuator generates a clamping force, and comparing the idle travel values with a plurality of expected idle travel values of the actuator that are determined as a function of an actuation of a pressure generator. The brake system includes a wheel brake having a brake piston, a brake pedal device, the pressure generator configured to generate a pressure generator force that moves the brake piston in order to active the wheel brake, and the actuator assigned to the wheel brake and configured to generate an actuator force that moves the brake piston in order to activate the wheel brake. The pressure generator and the actuator are actuated such that together they generate a total clamping force.

8 Claims, 3 Drawing Sheets

METHOD AND DEVICE FOR OPERATING A HYDRAULIC BRAKE SYSTEM, BRAKE SYSTEM

This application claims priority under 35 U.S.C. § 119 to patent application no. DE 10 2016 223 826.4, filed on Nov. 30, 2016 in Germany, the disclosure of which is incorporated herein by reference in its entirety.

BACKGROUND

The disclosure relates to a method for operating a hydraulic brake system of a motor vehicle, wherein the brake system has at least one wheel brake, one brake pedal device and at least one actuatable pressure generator for hydraulically activating the wheel brake as well as an electromechanical actuator which is assigned to the wheel brake and has the purpose of activating the wheel brake, wherein the pressure generator and the actuator can each generate a force for moving a brake piston of the wheel brake for the activation thereof, wherein the pressure generator and the actuator are actuated in such a way that together they generate a total clamping force.

Furthermore, the disclosure relates to a device for operating such a brake system and to a brake system of this type.

The method, device and brake systems of the type mentioned at the beginning are already known from the prior art. Hydraulic brake systems are usually employed as a service brake in motor vehicles, with which service brake the driver of a motor vehicle can set a desired braking torque at the wheels of the motor vehicle. For this purpose, a brake pedal device has a brake pedal which can be activated by the driver in order to generate a hydraulic pressure in the brake system, if appropriate using a brake booster and a masterbrake cylinder. It has also become known also to use hydraulic brake systems as handbrakes or parking brakes. It is also known to assign, in addition to the hydraulic brake system, an electromechanical actuator to one or more wheel brakes which interacts with the respective wheel brake in order to move a brake piston into a brake application position and hold it there. By means of self-locking transmission between the drive and the brake piston, the brake piston can be locked in the brake application position without further energy having to be consumed. The transmission is usually a self-locking spindle/spindle nut arrangement. The latter is driven by an electric motor of the actuator. In the brake system, in which the brake application force for the handbrake function is made available solely by the electromechanical actuator, methods are already known for monitoring or ensuring the brake application force. It is also known to safeguard the hydraulic portion on the basis of intrinsic variables of the electromechanical actuator, wherein the functional capability of the hydraulic part of the brake system is inferred as a function of at least one electrical characteristic variable of the actuator. However, until now this has only been possible when the actuator and pressure generator are actuated simultaneously.

SUMMARY

The method according to the disclosure has the advantage that it permits monitoring or checking of the actual hydraulic pressure at the wheel brakes by means of the electromechanical actuator, in particular in the case of sequential actuation of the pressure generator and actuator. According to the disclosure there is provision that in order to check the functional capability of the brake system, idle travel values of the electromechanical actuator is detected up to an increase in clamping force and is compared with idle travel values of the actuator which is expected as a function of the actuation of the pressure generator. By comparing the actual idle travel values of the electromechanical actuator and the expected idle travel values it is possible to detect whether the brake piston has been moved by the pressure generator or not. If the brake piston has been moved hydraulically by the pressure generator, the idle travel values of the electromechanical actuator which the latter must overcome before it generates a clamping force increases. The idle travel values which is expected to be set as a result in the increase in hydraulic pressure can be calculated as a function of the actuation of the pressure generator. By comparing the calculated idle travel values with the actual idle travel values which the actuator must overcome until the actuator applies a movement force to the brake piston or increases a clamping force, it is therefore possible to ascertain whether the hydraulic system is functioning satisfactorily. If, for example, the hydraulic system were to have a leak, this would lead to a situation in which the brake piston is displaced less far than expected by the actuation of the pressure generator, as a result of which the idle travel values of the actuator is shortened compared to the expected idle travel values. A simple and cost-effective possibility of ascertaining the functional capability of, in particular, the hydraulic system of the brake system is therefore offered.

The pressure generator and the actuator are preferably actuated in such a way that the force which is generated by the pressure generator is generated before the force which is generated by the electromechanical actuator or acts on the brake piston. This ensures that the idle travel values of the electromechanical actuator comes about or becomes greater when the hydraulic system is functioning correctly. As a result, reliable detection of the functional capability of the brake system is reliably ensured. The method ensures that it is detected whether the piston is/has been actually moved by the actuation of the hydraulic pressure generator or whether the pressure which is generated by the hydraulic pressure generator is effectively present on the brake piston.

According to one preferred development of the disclosure there is provision that the actuator is not actuated until the actuation of the pressure generator has ended. This ensures that starting from the actuation of the actuator the position the brake piston is no longer changed by the hydraulic part of the brake system and as a result the idle travel values of the actuator is influenced. This ensures the reliable detection of the functional capability of the brake system.

Furthermore there is preferably provision that the expected idle travel values is determined as a function of a hydraulic pressure which is to be generated by the pressure generator, and a brake piston effective area. However, if a line of the hydraulic system is damaged, the actual hydraulic pressure does not correspond to the hydraulic pressure to be generated. Correspondingly, the hydraulic pressure to be generated, and not the actual hydraulic pressure, is used as the basis for the determination of the expected idle travel values.

Furthermore, there is preferably provision that a hydraulic volume which is delivered by the pressure generator is determined as a function of the hydraulic pressure to be generated, and the brake piston effective area. Given knowledge of the brake piston effective area and of the hydraulic pressure to be generated, it is possible to calculate the hydraulic volume which has to be delivered necessarily by the pressure generator to the wheel brake in order to increase the hydraulic pressure to be generated.

The hydraulic volume is preferably determined by means of a characteristic curve or a characteristic diagram as a function of the hydraulic pressure to be generated by the pressure generator. Such ($\rho V$ characteristic curves) are basically known and can therefore be determined and applied to the present method without a large amount of expenditure. The hydraulic volume can be determined quickly and in cost-saving fashion by means of the characteristic curve or the characteristic diagram. Given knowledge of the diameter of the brake piston, it is possible to calculate an increase in volume and therefore movement travel of the brake piston and therefore idle travel values which is to be additionally overcome by the actuator.

In order to sense the actual idle travel values of the actuator, an electrical operating variable, in particular an operating current, of the actuator is preferably monitored. The idle travel values is overcome when the increase in clamping force begins, or when the brake piston engages the brake linings of the wheel brake against a brake disk. At the start of the increase in clamping force, the current consumption of the actuator changes. The operating current of the actuator increases during the increase of clamping force owing to the increased opposing force. This increase in operating current can be ascertained by means of simple current monitoring means in that the time at which the idle travel values has been overcome by the actuator can easily be ascertained. The actual idle travel values is advantageously estimated or calculated using known methods on the basis of the ascertained time at which the idle travel values of the electromechanical actuator has been overcome, or on the basis of the acquired profile of the operating current, wherein, for example, expanded analytical methods are applied for estimating the parameters of a DC machine on the basis of which the rotational angle of the motor and subsequently the travel of the electromechanical actuator, dependent on the rotational angle, are inferred from the state variables of the motor current and the motor voltage. The idle travel values which is determined in this way can then easily be compared with the previously calculated idle travel values or with the expected idle travel values, in order to determine the functional capability of the brake system as described above.

Furthermore, there is preferably provision that in the case of a brake circuit with a plurality of wheel brakes which each have an actuator, the respectively detected idle travel values are compared with one another for plausibility checking. As a result it can be ascertained whether the deviation of the respective idle travel values from the expected idle travel values is caused by a fault in the hydraulic system or, for example, by a fault in the mechanical or electromechanical part of the wheel brake. In particular, it is possible thereby to rule out the possibility of a fault being incorrectly detected in the hydraulic system. If the two detected idle travel values at the actuators correspond with one another and are less than the expected idle travel values, it is detected on that basis that the hydraulic system has a leak or damage. If the idle travel values correspond to one another and are greater than the expected idle travel values, the secured stationary state of the motor vehicle is preferably indicated to the driver, for example by means of a parking brake lamp. An excessively increased value is not critical in this case because this indicates an excessively high hydraulic pressure, which, however, also ensures the stationary state.

The device disclosed herein is further distinguished by a control unit which is specifically configured to carry out the method according to the disclosure in the case of correct use. This results in the advantages which have already been specified.

The brake system disclosed herein is distinguished by the control unit according to the disclosure. The advantages which have already been mentioned are also obtained here.

Further advantages and preferred features and combinations of features can be found, in particular, in what is described above and in the claims.

BRIEF DESCRIPTION OF THE DRAWINGS

In the text which follows, the disclosure will be explained in more detail with reference to the drawing, in which.

DETAILED DESCRIPTION

Figure 1:
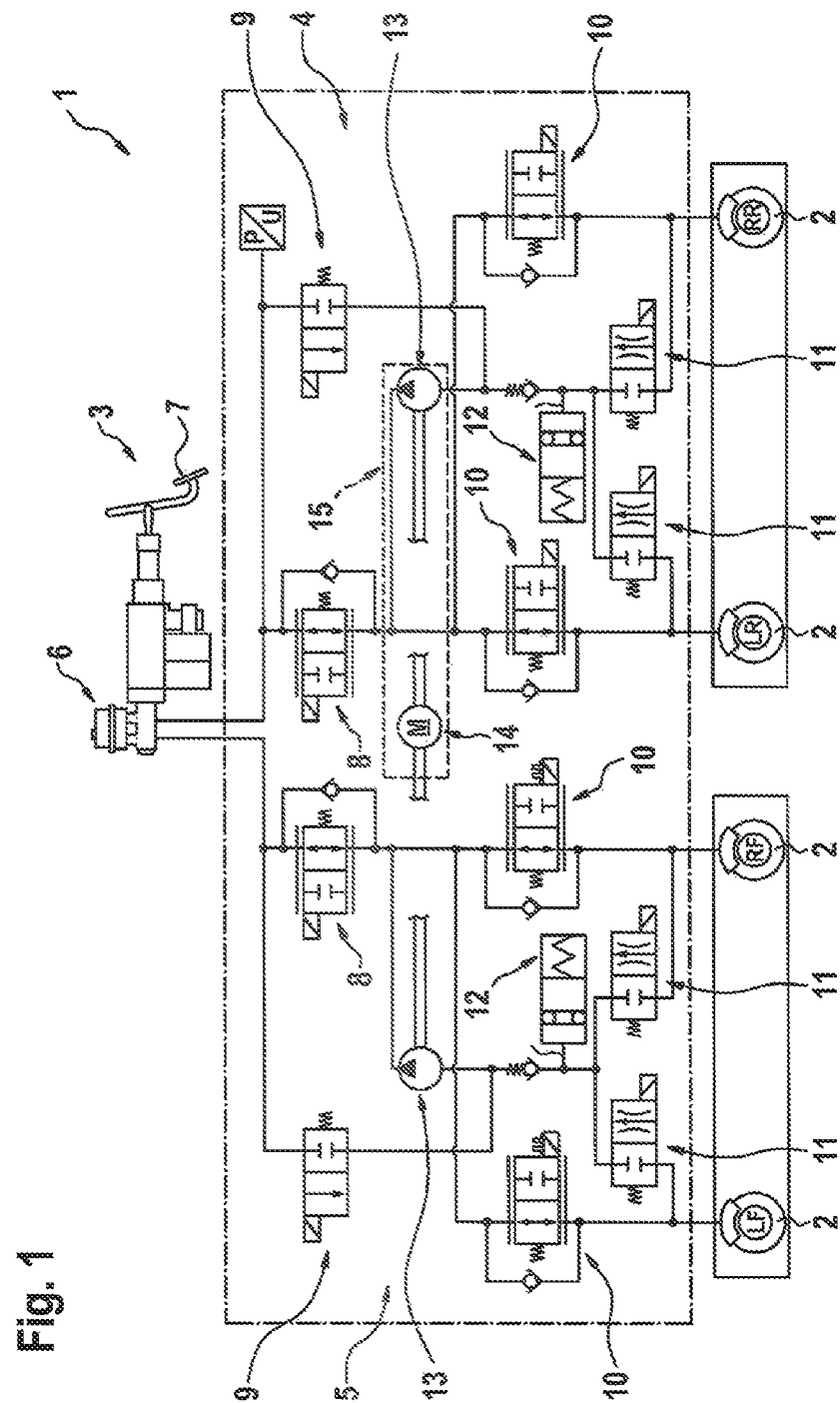
FIG. 1 shows a brake system of a motor vehicle in a simplified illustration.

FIG. 1 shows a simplified illustration of a brake system 1 for a motor vehicle (not illustrated in more detail here). The brake system 1 has a plurality of wheel brakes 2 which can be activated by a driver of the motor vehicle by means of a brake pedal device 3 as service brakes. The wheel brakes 2 are denoted here by LF, RF, LR and RR, as a result of which their position or assignment on the motor vehicle is explained, wherein LR stands for left rear, RF stands for right front, LF stands for left front and RR stands for right rear. Two brake circuits 4 and 5 are formed between the brake pedal device 3 and the wheel brakes 2, wherein the brake circuit 4 is assigned to the wheel brakes LR and RR, and the brake circuit 5 is assigned to the wheel brakes LF and RF. The two brake circuits 4 and 5 are of identical design, with the result that the design of both brake circuits 4, 5 will be explained in more detail below with reference to the brake circuit 4.

The brake circuit 4 is firstly connected to a masterbrake cylinder 6 of the brake pedal device 3, wherein the brake pedal device 3 also has a brake pedal 7 which can be activated by the driver and a brake booster. The brake circuit 4 has a switching valve 8 and a high-pressure switching valve 9 which are connected in parallel with one another and follow the masterbrake cylinder 6. The switching valve 8 is embodied to be open in the currentless state and permits the flow of the hydraulic medium of the brake circuit, that is to say of the brake fluid, in both directions. The high-pressure switching valve 9 is embodied to be closed in the currentless state and in the energized state permits a throughflow of brake fluid only in the direction of the wheel brakes 2. The switching valve 8 is also connected to the two wheel brakes 2 with intermediate connection of one inlet valve 10 in each case, which inlet valve 10 is embodied so as to be opened in both directions. The wheel brakes 2 of the brake circuit 4 are also each assigned an outlet valve 11 which is embodied so as to be closed in the currentless state. A hydraulic pressure accumulator 12 is connected downstream of the outlet valves 11. On the outlet side, the outlet valves 11 are also connected to a suction side of a pump 13 which is connected on the pressure side to the brake circuit 4 between the switching valve 8 and the inlet valves 10. The pump 13 is mechanically coupled to an electric motor 14, wherein the pump 13 and the electric motor 14 form together a brake generator 15 of the brake system 1. There is provision that the electric motor 14 is assigned to the pumps 13 of both brake circuits 4 and 5. Alternatively there can also be provision that each brake circuit 4, 5 has a separate electric motor 14.

If the two switching valves 8 of the brake circuits 4, 5 are closed, the hydraulic pressure in the section of the brake circuits 4, 5 located behind them, that is to say between the switching valves and the wheel brakes 2, continues to be closed or maintained, even if the brake pedal 7 is relieved of loading by the driver.

Figure 2:
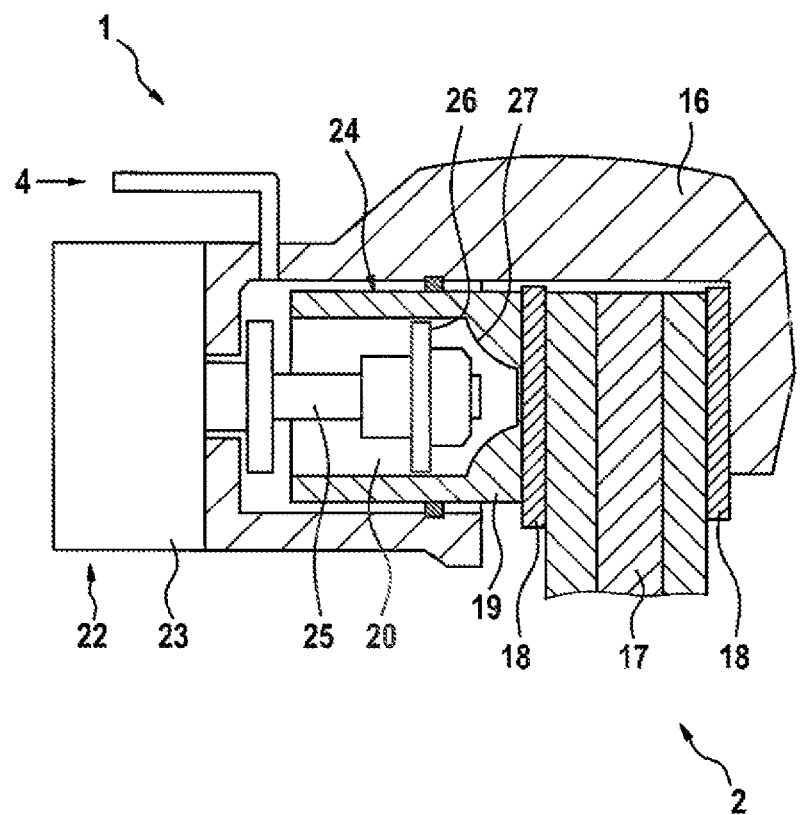
FIG. 2 shows a wheel brake of the brake system in a simplified longitudinal sectional illustration.

FIG. 2 shows a simplified sectional illustration of the configuration of the wheel brakes 2. The respective wheel brake 2 has a brake caliper 16 which engages around a brake disk 17 on its face sides, said brake disk 17 being connected in a rotationally fixed fashion to a wheel of the motor vehicle. Each face side of the brake disk 17 is assigned here a brake lining 18 of the wheel brake 2. One of the brake linings 18 is embodied here on one face side of a brake piston 19 which is mounted displaceably the brake caliper 16. The brake piston 19 has in a longitudinal section a beaker-shaped structure, with the result that it forms a cavity 20 together with a receptacle 21 of the brake caliper 16, in which receptacle 21 the brake piston 19 is displaceably mounted. The cavity 20 is fluidically connected here to the inlet valve 10, with the result that when the inlet valve 10 and the switching valve 8 are opened and the brake pedal 7 is activated, the hydraulic pressure acts on the brake piston 19 in order to displace it against the brake disk 17, as a result of which the brake disk 17 is tensioned or clamped between the brake linings 18 of the wheel brake 7. Alternatively, by closing the switching valve 8 and actuating the pressure generator 15, the hydraulic pressure is generated in the brake circuit 4 in an automated fashion. This is the case here if the driver operates a pushbutton key or switch in order to activate a handbrake.

The brake piston 19 is also assigned an electromechanical actuator 22 which has an electric motor 23 and a transmission 24 which is operatively connected to the electric motor 23. The transmission is embodied as a spindle gear mechanism which comprises a spindle 25 which is connected in a rotationally fixed fashion to the electric motor 23, and a spindle nut 26 which is mounted in a rotationally fixed fashion in the brake piston 19 and in a longitudinally displaceable fashion on the spindle 25. If the spindle is driven by the electric motor 23, this causes the spindle nut 26 to be longitudinally displaced in the brake piston 19. In this context, the spindle nut 26 can be displaced by the rotational movement of the spindle 25 to such an extent that it impacts against an axial stop 27 of the brake piston 19 in the space 20, as a result of which the brake piston 19 is entrained by the spindle nut 26. Actuating the actuator 22 therefore also causes a force to be applied to the brake piston 19 in order to move it, on which force the force which is applied by the hydraulic pressure is or can be superimposed.

Figure 3:
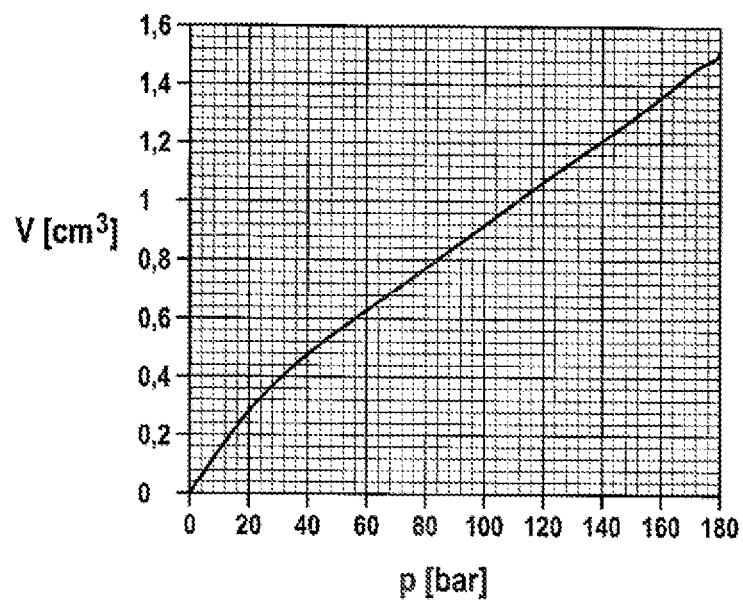
FIG. 3 shows a $\rho V$ characteristic curve of the wheel brake.

In the text which follows, an advantageous method for operating the brake system 1 will be explained with reference to FIGS. 3 and 4, which method is carried out by means of a control unit (not illustrated) and by means of which the functional capability of the hydraulic part of the brake system 1 is checked or monitored for functional capability. The method has the advantage that sequential actuation of the pressure generator 15 and actuator 22 takes place, as a result of which the actual hydraulic pressure at the wheel brakes 2 is made possible by monitoring an electrical characteristic variable of the actuator 22. The method is based here on the idea of monitoring the idle travel values of the electromechanical actuator 22 and comparing it with an expected idle travel values of the actuator, which is obtained from movement of the brake piston 19 by the hydraulic pressure generator 15. The method is based here on the following conditions:

The absolute travel position of the brake piston 19 is known. Different variants for communicating the current travel position of a brake piston of wheel brakes are already known from the prior art and can be employed in the present method.

The $\rho V$ characteristic curve (pressure-volume characteristic curve) of the wheel brakes 2 is known. An example is shown in FIG. 3. This shows the $\rho V$ characteristic curve of the wheel brake 2 of one of the wheel brakes LR or RR which are assigned to the rear axle of the motor vehicle. The volume capacity V of the wheel brake 2 is plotted against the pressure p. As a further condition it is defined that the pressure generator 15 reaches its target pressure or that the actuation of the pressure generator has ended before the actuator 22 is actuated, and in particular, starts with the increase the clamping force.

Figure 4:
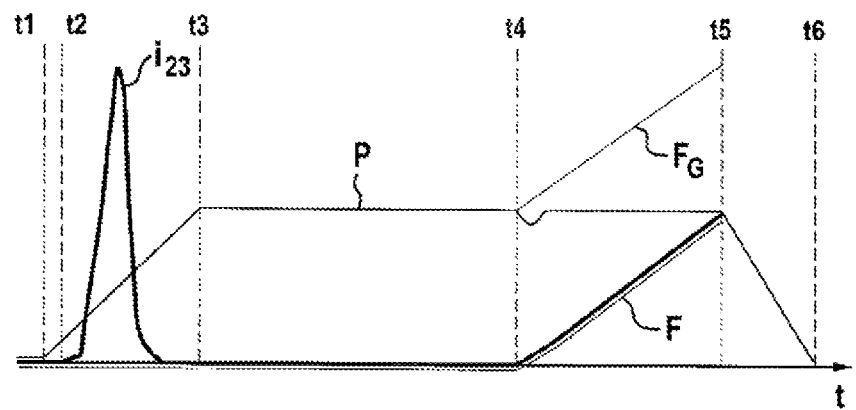
FIG. 4 shows a diagram explaining an advantageous method for operating the brake system.

FIG. 4 shows in this respect an exemplary procedure. FIG. 4 shows in this respect a diagram in which the operating current $i_{23}$ of the electric motor 23 of the actuator 22, the clamping force F which is made available or set by the actuator 22, the hydraulic pressure $\rho$ which is set by the pressure generator 15, and the force $F_G$ which acts in total on the brake piston 19 are plotted against the time t. The pressure generator 15 can be embodied integrated into the brake circuits 4, 5 here as shown in FIG. 1. The pressure generator 15 is preferably integrated as a pressure generator, in particular one of the electrohydraulic brake booster type, which is integrated into the brake pedal device 3.

The fact that the pressure generator 15 reaches its target pressure before the actuator 22 is actuated or starts the increase of clamping force at the time t4 does not preclude the possibility of the pressure generator 15 continuing to adjust, during the increase of the clamping force, the volume of the wheel brake which is displaced by the actuator 22. As soon as the actuator 22 exerts a movement force on the brake piston 19, the latter is moved, as a result of which the volume in the wheel brake 2 is increased. This increased volume can be re-adjusted by continuing to feed further hydraulic medium by means of the pressure generator 15. However, a condition of this is that the pressure generator 15 does not apply a larger pressure force to the brake piston 19 than was originally fed in up to the start of the increase of the clamping force at the time t4. Otherwise, given simultaneous hydraulic and electromechanical actuation of the brake piston 19, a change in the operating current signal $i_{23}$ of the actuator 22 could occur, as a result of which the correct detection of the start of the increase of the clamping force (time t4) can be made more difficult.

Because both actuators, that is to say the pressure generator 15 and actuator 22, act on the same brake piston 19, the travel of the brake piston 19 can be determined by reference to the $\rho V$ characteristic curve and using the rigidity of the brake caliper. Firstly, the respective wheel brake 2, in particular both wheel brakes 2, of the rear axle of the motor vehicle are actuated only hydraulically by the pressure generator 15, wherein for this purpose the valves of the corresponding brake circuits 4, 5 are correspondingly opened or closed. In particular, the switching valves 8 are closed and the inlet valves 10 for the respective wheel brake in which the handbrake function is to be set are opened. As a result, the brake piston 19 is moved. This "hydraulic"

travel of the brake piston 19 can be understood to be additional idle travel values of the actuator 22: for the present exemplary embodiment it is assumed here that the pressure generator makes available a hydraulic pressure of $\rho=70$ bar, and the actuator makes available a mechanical force of $F=10$ kN.

As already mentioned above, the hydraulic pressure is firstly increased. The volume $V_r$ which is required for this can be derived from the $\rho V$ characteristic curve in FIG. 3. In this exemplary embodiment, 0.74 cm³ is required for the wheel brake 2.

From this it is possible to calculate a hydraulic travel s 15 of the brake piston with a brake piston diameter of d=38 mm and the resulting effective area:

$$s_{15} = \frac{Vr}{d^2 \cdot \pi \cdot \frac{1}{4}} = \frac{740 \text{ mm}^3}{(38 \text{ mm})^2 \cdot \pi \cdot \frac{1}{4}} 0.65 \text{ mm}$$

When the electromechanical actuator 22 is released, idle travel values is always set which ensures that no residual braking torque is present during the travel, and therefore that the service brake is not influenced. This idle travel values is denoted here as $s_{idle}$. If the hydraulic actuator 15 has already displaced the brake piston 19 by $s_{15}$, it is expected that the actual idle travel values $s_{22}$ of the electromechanical actuator 22 $s_{22}=s_{15}+s_{idle}$. If it is assumed that $s_{idle}=0.6$ mm, idle travel values of $s_{22}=1.25$ mm is therefore obtained for the idle travel values $s_{22}$ of the actuator 22.

After the start of the increase of force, that is to say starting from the time $t_4$, the determined idle travel values $s_{15}$ of the two wheel brakes 2 of a brake circuit 4, 5 are compared with the value which has been previously determined with reference to the $\rho V$ characteristic curve. If the value at the two wheel brakes 2 corresponds to the expected value or is greater than said value, the continuous parking capability or stopping capability of the brake system 1 is preferably indicated to the driver by means of a parking brake lamp. A relatively large value is not critical in this case because this indicates an excessively high hydraulic pressure, but this secures the stationary state. In addition, the following fault scenarios are also possible:

If at a wheel brake 2, for example LR, the idle travel values $s_{15}$ is to the expected value, and at the other wheel brake of the rear axle RR the idle travel values $s_{15}$ is lower over a predefinable tolerance range than the expected value, this indicates that the hydraulic pressure at the wheel brake LR is too small. This can indicate a squeezed brake line on the left-hand side or a leak. If the idle travel values $s_{15}$ at both wheel brakes is lower than the expected value, this means that the requested hydraulic pressure has not arrived at the two wheel brakes 2 of the rear axle LR, RR, and this can be caused by a faulty pressure measurement, if a pressure sensor indicates an excessively high value, a leak or two squeezed brake lines.

If one of the two fault scenarios occurs, the driver of the motor vehicle is preferably warned visually and/or acoustically with a corresponding warning message.

If the speed at which the actuator 22 moves the brake piston is known, the travel time for overcoming the idle travel values ($t_2$ to $t_4$) can also be evaluated as an alternative to evaluating the additional idle travel values $s_{15}$.

What is claimed is:

1. A method for operating a hydraulic brake system of a motor vehicle, the brake system including at least one wheel brake, a brake pedal device, at least one actuatable pressure generator for hydraulically activating the at least one wheel brake, and an electromechanical actuator assigned to the at least one wheel brake for activating the at least one wheel brake, the method comprising:
   generating, by operating the pressure generator, a first force for moving a brake piston of the at least one wheel brake to activate the at least one wheel brake;
   after commencing the generation of the first force, generating, by operating the electromechanical actuator, a second force for moving the brake piston to act on that at least one wheel brake, wherein the first and second forces combine to generate a total clamping force acting on the brake piston; and
   checking a functional capability of the brake system by:
      detecting idle travel values from the operation of the electromechanical actuator up to an increase in clamping force, and
      comparing the detected idle travel values with expected idle travel values of the electromechanical actuator that are based on the operation of the pressure generator.

2. The method according to claim 1, further comprising:
   determining expected idle travel values of the electromechanical actuator as a function of a hydraulic pressure generated during the generation of the first force with the pressure generator and (ii) a brake piston effective area.

3. The method according to claim 2, the determining of the expected idle travel values further comprising:
   determining a hydraulic volume delivered by the pressure generator during the generation of the first force as a function of the hydraulic pressure generated and the brake piston effective area.

4. The method according to claim 3, the determination of the hydraulic volume further comprising:
   determining the hydraulic volume based on a characteristic curve or a characteristic diagram as a function of the hydraulic pressure generated by the pressure generator.

5. The method according to claim 1, further comprising:
   detecting the idle travel values of the electromechanical actuator by monitoring and evaluating an operating current of the electromechanical actuator.

6. The method according to claim 1, wherein:
   a brake circuit includes a plurality of wheel brakes which each have an electromechanical actuator, and
   the method further includes comparing respectively detected idle travel values with one another for plausibility checking.

7. The method according to claim 1, wherein a control unit is configured to carry out the method.

8. A brake system for a motor vehicle, comprising:
   at least one wheel brake;
   a brake pedal device;
   at least one electrohydraulic pressure generator configured to hydraulically activate the at least one wheel brake;
   an electromechanical actuator assigned to the at least one wheel brake and configured to activate the at least one wheel brake, wherein the pressure generator and the electromechanical actuator are each configured to generate a force for moving a brake piston of the at least one wheel brake for activation of the at least one wheel brake; and a control unit configured to actuate the pressure generator and the electromechanical actuator in order to set a parking brake function, wherein the control unit is configured to:
generate a first force, by operating the pressure generator, for moving a brake piston of the at least one wheel brake to activate the at least one wheel brake;
after commencing the generating of the first force, generating a second force, by operating the electromechanical actuator, for moving the brake piston to active that at least one wheel brake, wherein the first and second forces combine to generate a total clamping force acting on the brake piston; and
check a functional capability of the brake system by:
detecting idle travel values from the operation of the electromechanical actuator up to an increase in clamping force, and
comparing the detected idle travel values with expected idle travel values of the electromechanical actuator that are based on the operation of the pressure generator.

* * * * *

UNITED STATES PATENT AND TRADEMARK OFFICE
CERTIFICATE OF CORRECTION

PATENT NO. : 10,399,552 B2
APPLICATION NO. : 15/824505
DATED : September 3, 2019
INVENTOR(S) : Edith Mannherz and Helmut Wolff It is certified that error appears in the above-identified patent and that said Letters Patent is hereby corrected as shown below:

In the Claims

Column 8, Line 26, In Claim 2, insert --(i)-- between the words "of" and "a".

Signed and Sealed this
Seventeenth Day of December, 2019

Andrei Iancu
*Director of the United States Patent and Trademark Office*